US010408414B2

United States Patent
Ramos, II (10) Patent No.: US 10,408,414 B2
(45) Date of Patent: Sep. 10, 2019

(54) HEADLAMP ASSEMBLIES WITH BEZEL STRUCTURES HAVING AIRFLOW OPENINGS

(71) Applicant: Toyota Motor Engineering & Manufacturing North America, Inc., Erlanger, KY (US)

(72) Inventor: Francisco A. Ramos, II, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 172 days.

(21) Appl. No.: 15/471,758

(22) Filed: Mar. 28, 2017

(65) Prior Publication Data

US 2018/0283648 A1   Oct. 4, 2018

(51) Int. Cl.
| | |
|---|---|
| *B60Q 1/04* | (2006.01) |
| *F21S 45/33* | (2018.01) |
| *B60Q 1/00* | (2006.01) |
| *F21S 41/20* | (2018.01) |
| *F21S 41/141* | (2018.01) |
| *F21S 41/50* | (2018.01) |

(Continued)

(52) U.S. Cl.
CPC ............ *F21S 45/33* (2018.01); *B60Q 1/0017* (2013.01); *B60Q 1/04* (2013.01); *F21S 41/141* (2018.01); *F21S 41/148* (2018.01); *F21S 41/151* (2018.01); *F21S 41/28* (2018.01); *F21S 41/50* (2018.01); *F21S 45/435* (2018.01); *F21S 45/60* (2018.01); *F21S 41/32* (2018.01); *F21Y 2115/10* (2016.08)

(58) Field of Classification Search
CPC . B60Q 1/04; F21S 41/25; F21S 48/335; F21S 48/1233
See application file for complete search history.

(56) References Cited

U.S. PATENT DOCUMENTS

| | | |
|---|---|---|
| 8,408,771 B2 | 4/2013 | Mikami et al. |
| 8,967,842 B2 | 3/2015 | Shah et al. |

(Continued)

FOREIGN PATENT DOCUMENTS

| | | | |
|---|---|---|---|
| DE | 3007326 C2 | 3/1988 | |
| WO | WO-2017026856 A1 * | 2/2017 | ............ H01L 35/30 |

*Primary Examiner* — Karabi Guharay
(74) *Attorney, Agent, or Firm* — Dinsmore & Shohl LLP (57) ABSTRACT

A headlamp assembly including a light source element, an outer lens, a fan, and a bezel structure, wherein the bezel structure is disposed forward of the fan in a vehicle-longitudinal direction and includes an air flow directing feature directing air flow from the fan toward the inner surface of the lens. Embodiments of the headlamp assembly generate light using low-temperate light emitting diodes (LEDs) and direct air flow over components thermodynamically coupled to the LEDs such that the air absorbs heat from the components and distributes the heat throughout the headlamp assembly, especially on the inner surface of the outer lens to reduce the condensation thereon. Further, embodiments may include a bezel structure having a pair of vehicle-forward concave sections disposed at the forward end of the bezel structure that disperse air through the headlamp assembly in a wide aperture to distribute thermal energy more equally throughout the headlamp assembly.

17 Claims, 6 Drawing Sheets

(51) Int. Cl.
*F21S 45/60* (2018.01)
*F21S 45/435* (2018.01)
*F21S 41/148* (2018.01)
*F21S 41/151* (2018.01)
F21Y 115/10 (2016.01)
F21S 41/32 (2018.01)

(56) References Cited

U.S. PATENT DOCUMENTS

| | | |
|---|---|---|
| 8,985,824 B2 | 3/2015 | Ito et al. |
| 2011/0310631 A1 | 12/2011 | Davis |
| 2016/0084471 A1 | 3/2016 | Sander et al. |
| 2016/0109087 A1 | 4/2016 | Ito et al. |
| 2018/0231207 A1* | 8/2018 | Shin .................. H01L 35/30 |

* cited by examiner

HEADLAMP ASSEMBLIES WITH BEZEL STRUCTURES HAVING AIRFLOW OPENINGS

TECHNICAL FIELD

The present application relates to headlamp assemblies for illuminating spaces and, more specifically, headlamp assemblies with bezel structures having airflow openings.

BACKGROUND

Headlamps are used to light the space in front of a vehicle. Over the years, headlamps have used acetylene, electric current, halogen, high-intensity discharge systems, and other methods to illuminate a lamp. Many of today's headlamps use light-emitting diodes (LEDs) as a light source. LEDs are relatively inexpensive and bright, making them an ideal candidate for a headlamp light source in some respects. However, differences between LEDs and other light sources create a need for additional engineering.

For example, LEDs may not generate as much heat as incandescent bulbs. Slight changes in temperature may provide some positive effects but may also lend themselves to further considerations. Lower temperatures may generally equate to less wasted energy, adding to the overall efficiency of the vehicle. Additionally, as LEDs may not experience "burn out," they may need replacing much less frequently. For example, a particular lamp may last an entire effective life of a vehicle. However, because the source of light may generate less heat, the average temperature inside a headlamp can be lower with an LED, and the headlamp may tend to develop condensation inside its lamp housing. That is, the bulb may not raise the temperature inside lamp housing sufficiently above the dew point temperature to evaporate moisture in the air within the housing.

Regardless of the type of light source within a headlamp, its particular structure may affect its propensity to develop condensation. Generally, surfaces near the light source will see higher temperatures than surfaces farther away as energy radiates from the source. Moreover, particular internal structures of various bulbs will tend to cause more or less airflow within the headlamp. Increased airflow can generally lead to more uniform airflow distributions and less condensation for a given light source. Thus, areas of low flow can be more susceptible to higher levels of condensation. Accordingly, a need exists for alternative lamp assemblies that permit less condensation.

SUMMARY

In one embodiment, a headlamp assembly for a vehicle having an outer lens having with an inner surface is claimed. The outer lens may define at least part of a cavity and there may be a light source element located within the cavity. Additionally, the cavity may include a fan assembly with a fan that directs air toward the inner surface of the outer lens and a bezel assembly. The bezel assembly may include a bezel structure having a longitudinal-extending portion and a front lip extending from the longitudinal-extending portion in a vehicle-vertical direction. The longitudinal-extending portion may direct air flow from the fan assembly toward the front lip and the front lip may include an air flow directing feature that may have an opening through which air may flow from the fan assembly toward the inner surface of the outer lens.

In another embodiment, a vehicle may include a headlamp assembly including an outer lens having an inner surface, and the outer lens may define at least part of a cavity. The headlamp assembly may include a light source element located within the cavity and a fan assembly located in the cavity that directs air toward the inner surface of the outer lens. Further, the headlamp assembly may include a bezel assembly having a bezel structure with a longitudinal-extending portion and a front lip extending from the longitudinal-extending portion in a vehicle-vertical direction. The longitudinal-extending portion may direct air flow from the fan assembly through an opening of the front lip.

In yet another embodiment, a method of reducing condensation inside a headlamp may include forcing air to move forward in a vehicle-longitudinal direction through a bezel assembly that includes a bezel structure with a longitudinal-extending portion and a front lip extending from the longitudinal-extending portion in a vehicle-vertical direction. The longitudinal-extending portion may direct air flow from a fan assembly toward the front lip, and the front lip may include an air flow directing feature with an opening through which air flows from the fan assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein generally relate to vehicles and headlamp assemblies that facilitate air flow from a fan or other device suitable for moving air toward an outer lens of the headlamp assemblies for the reduction of moisture or fogging on an interior surface of the outer lens. Embodiments of the headlamp assemblies include a bezel structure including a front lip that hides the interior components of the headlamp assemblies from casual observance from outside the vehicles. Included in the front lip of the bezel structure is an opening to allow for the passage of air through the front lip and out toward the outer lens. Such a configuration can generally increase circulation of air within the headlamp assemblies and can reduce condensation along the inner surface of the outer lens.

Condensation may be particularly concentrated on surfaces having a lower temperature than the surrounding air inside the headlamp assembly, such as the inside surface of the outer lens. If the temperature of the air outside the headlamp assembly is significantly lower than the air inside, a thermal gradient may exist across the thickness of the outer lens. When the temperature of the inside surface of the outer lens is below the dew point temperature of the air inside the headlamp assembly, moisture in the air may condense on the inner surface of the outer lens. Without intervention, this condensation could lead to decreased luminosity of the vehicle headlamps.

An anti-fogging coating may be provided on the inner surface of the outer lens. Anti-fogging coatings may consist of a surfactant film or can be crafted by creating a hydrophilic surface on the inner surface of the outer lens. Anti-fogging coatings can generally reduce the surface tension of water droplets condensing onto a surface and thus can inhibit the formation of large droplets. Often this is effective to reduce the amount of condensation on the inner surface of the outer lens, but additional measures may be used, particularly in the case of headlamp assemblies illuminated by LEDs. As mentioned, LEDs can tend to illuminate using less energy and produce less heat than traditional bulbs. Thus, the ambient temperature inside a headlamp assembly lit by an LED is less likely to reach a sufficient temperature to prevent condensation than an incandescent bulb, say, for a given humidity level within the headlamp assembly.

A fan assembly may be provided to circulate air over the LED to convect heat directly from the LED through a support structure (effectively a heat sink), and force that heated air toward the inner surface of the outer lens. This heated air can transfer heat to the inner surface and raise its temperature, thereby reducing condensation onto the inner surface of the outer lens. This approach can lead to decreased condensation within the headlamp.

Figure 1:
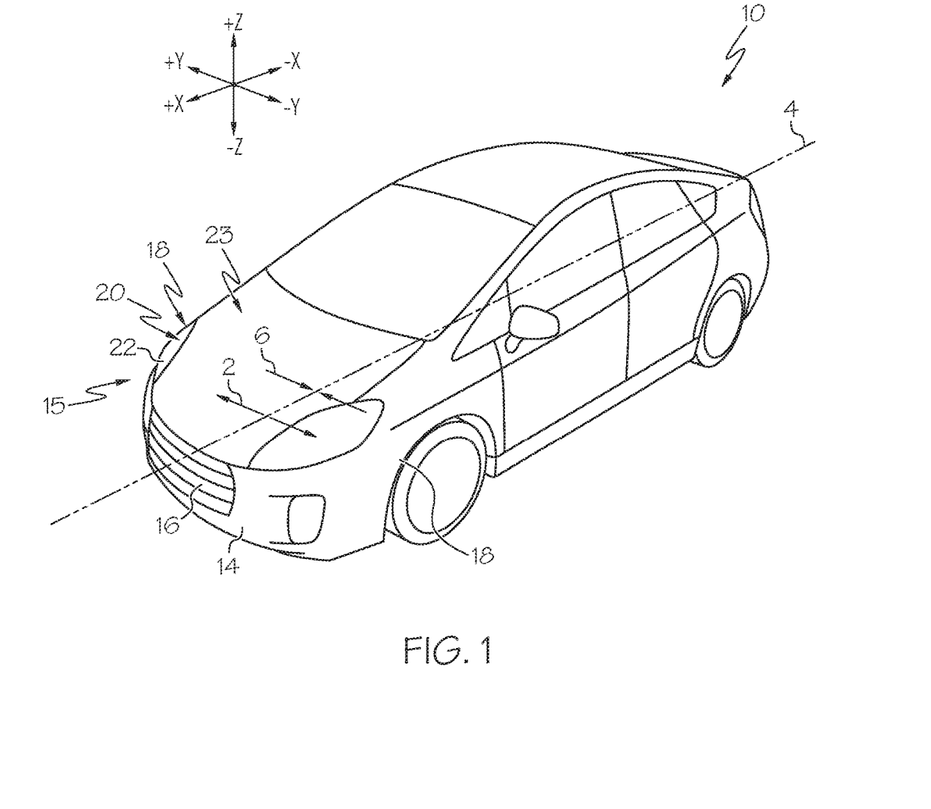
FIG. 1 depicts a perspective view of a vehicle having a headlamp assembly according to one or more embodiments shown and described herein.

As used herein, the term "vehicle-longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle-longitudinal direction. The term "vehicle-vertical direction" refers to the upward-downward direction of the vehicle (i.e., in the +/−vehicle Z-direction depicted in FIG. 1). Further, the terms "inboard," "inward." "outboard" and "outward" are used to describe the relative positioning of various components of the vehicle 10. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

While FIG. 1 depicts the vehicle 10 as a sedan, it may be recognized that the vehicle 10 may be other vehicle types such as a sport-utility vehicle (SUV), coupe, pick-up truck, or the like in various other embodiments. The vehicle 10 may include a headlamp assembly 20 located at a front assembly 15 of the vehicle 10. While FIG. 1 depicts the headlamp assembly 20 at the front of the vehicle 10, it will be appreciated that such an assembly could also be used at the rear of the vehicle to project light in a vehicle rearward direction. Additionally, particular embodiments may contain one or more headlamp assemblies facing a particular direction, such as, for example, hi-beams and lo-beams both directed in a vehicle forward direction.

In some embodiments, the headlamp assembly 20 may be part of the vehicle front assembly 15. The front assembly 15 may include various other components such as a bumper 14, a grille 16, and fenders 18. In particular embodiments, the headlamp assembly 20 is at least partially enclosed by an outer lens 22. The outer lens 22 may be located between the various other components of the front assembly 15, such as the bumper 14, the grille 16, the fenders 18, and/or the hood assembly 23. Various other components may be attached to or contact the headlamp assembly 20 such as the wheel wells and/or a bumper fascia.

Figure 2:
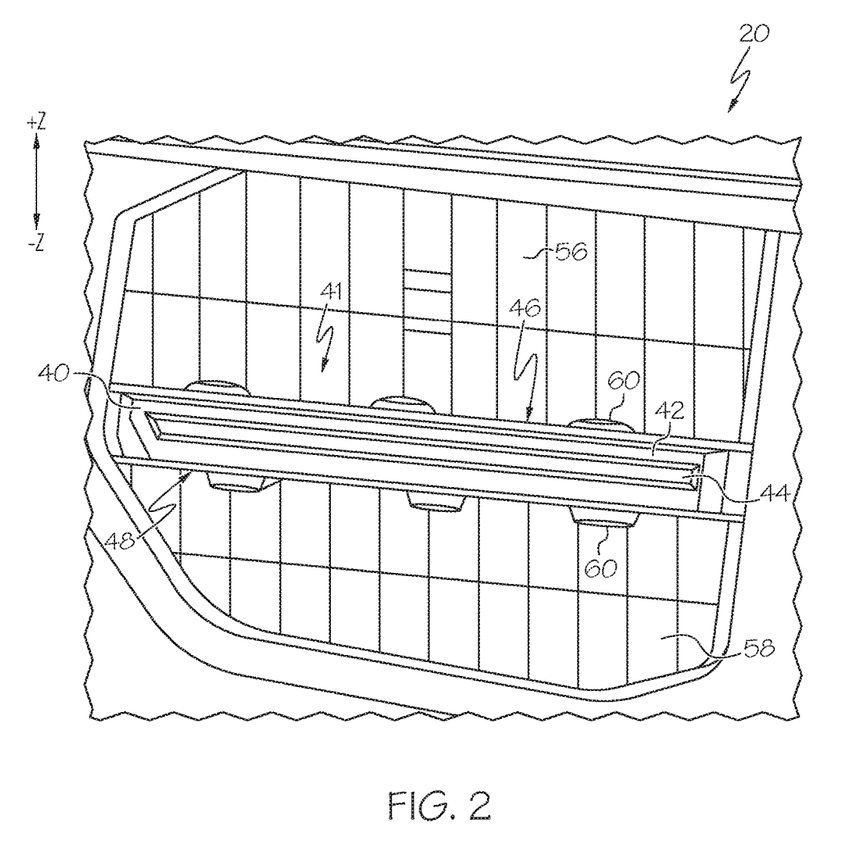
FIG. 2 depicts a front detail view of the vehicle headlamp assembly of FIG. 1 according to one or more embodiments shown and described herein.

Referring now to FIG. 2, a more detailed view of the headlamp assembly 20 is depicted in a front view. A longitudinal-extending portion 41 of a bezel structure 40 has a bezel top part 46 and a bezel bottom part 48. An opening 44 is provided through a front lip 42 of the bezel structure 40. Additionally, a top mirror assembly 56 and a bottom mirror assembly 58 are shown. A plurality of rear directors 60 surround light source elements 54 (FIG. 4) so that they cannot be seen directly from a frontal view, as demonstrated by FIG. 2. Additionally, the rear directors 60 reflect light that would project directly in a vehicle-forward direction back toward the top mirror assembly 56 and the bottom mirror assembly 58 to inhibit light from the headlamp assembly 20 from shining directly towards oncoming traffic.

Figure 6:
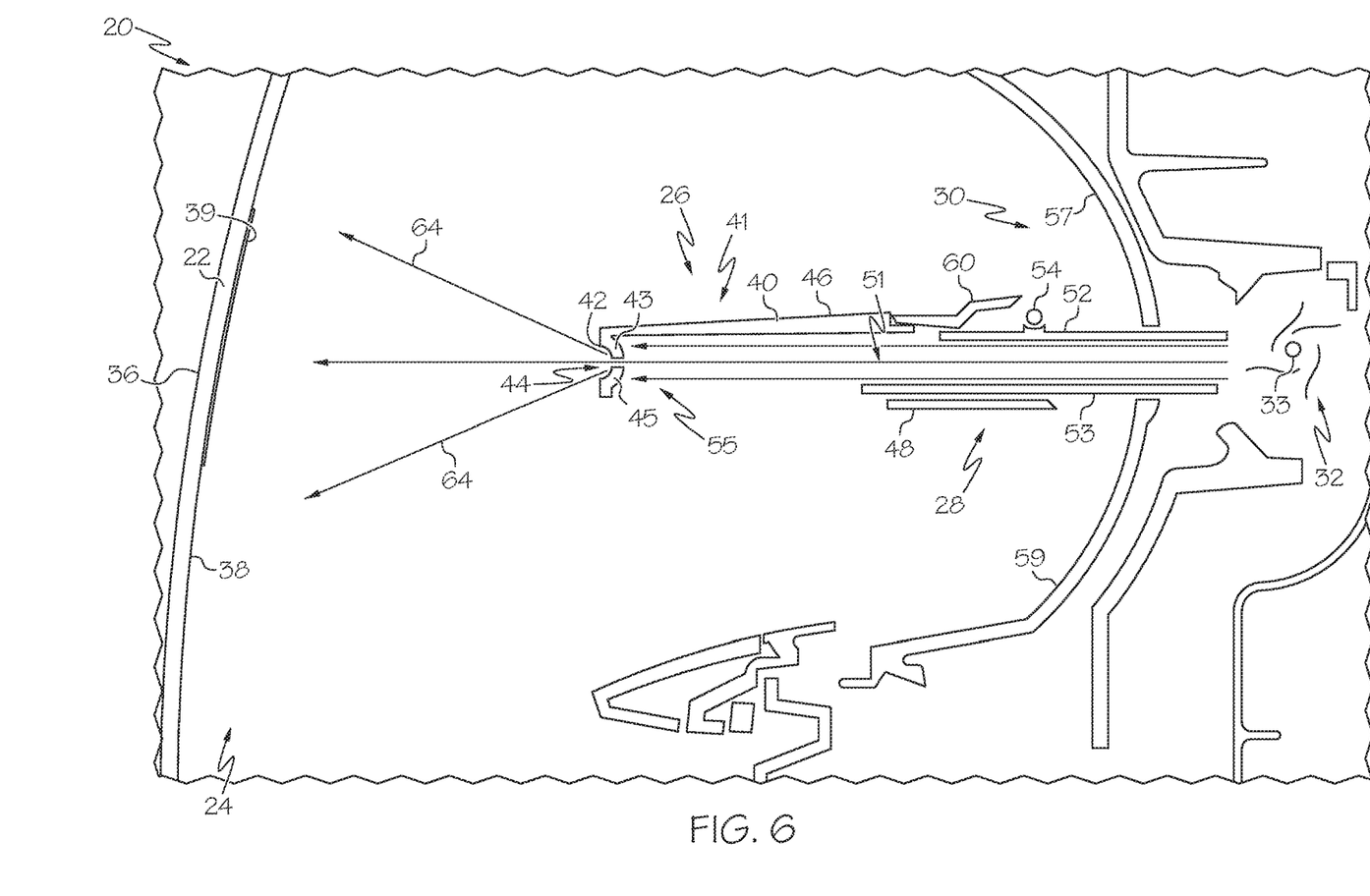
FIG. 6 depicts a diagrammatic side view of the vehicle headlamp assembly of FIG. 2 according to one or more embodiments shown and described herein.

The bezel structure 40 can hide inner components of the headlamp assembly 20 from sight. This can inhibit casual observance of the inner various components of the headlamp assembly 20. As will be described below, the opening 44 can facilitate the flow of air from the rear of the headlamp assembly 20 towards the outer lens 22 (FIG. 6). Headlamp assemblies having bezel structures without this opening 44 may experience reduced airflow throughout the headlamp assembly as compared to bezel assemblies 26 with the opening 44.

Figure 3:
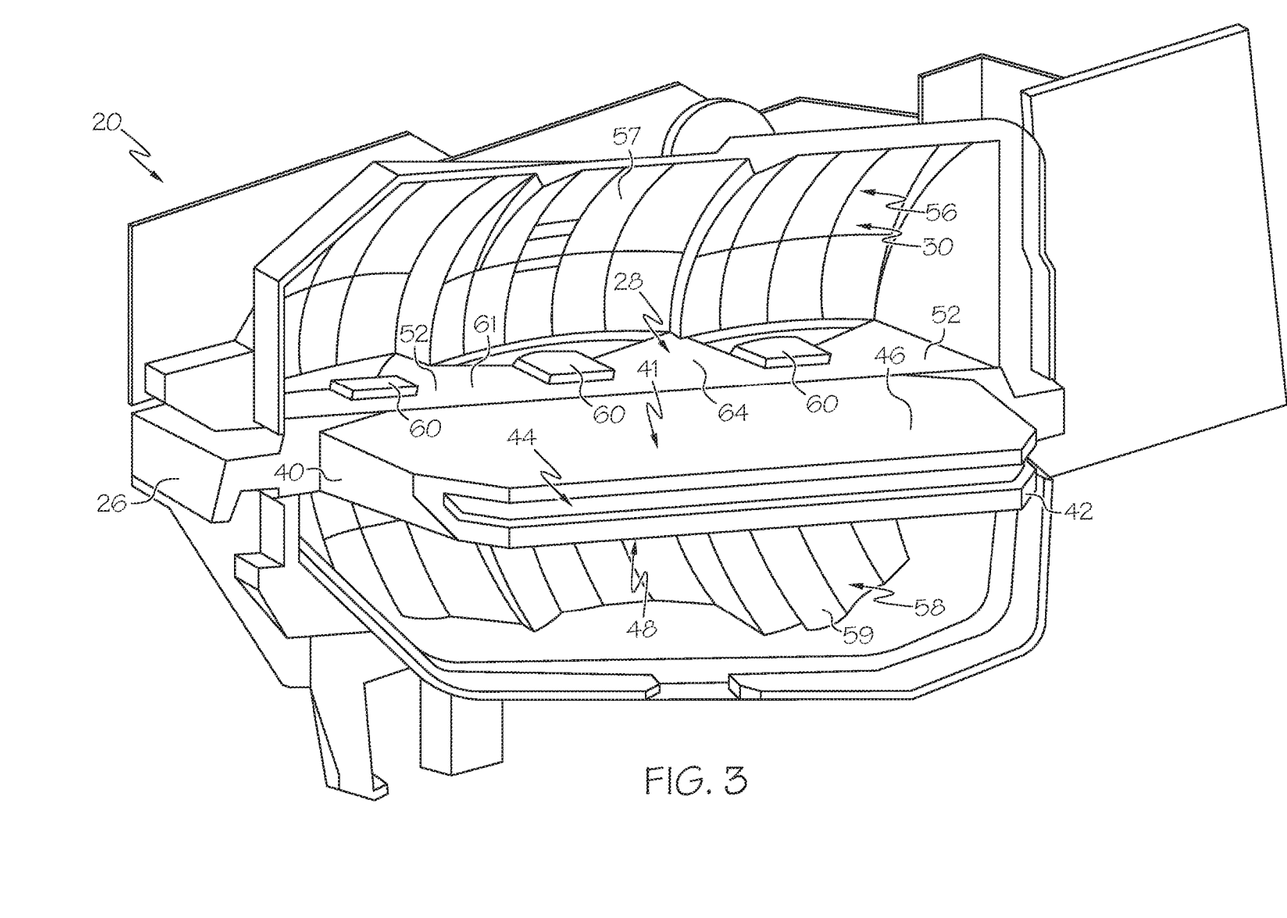
FIG. 3 depicts a perspective view of a vehicle lighting assembly for the vehicle headlamp assembly of FIG. 2 according to one or more embodiments shown and described herein.

Referring to FIG. 3, the headlamp assembly 20 is shown with the outer lens 22 removed. The headlamp assembly 20 may include a bezel assembly 26 including the longitudinal-extending portion 41 of the bezel structure 40 including the front lip 42 with the opening 44 in the front lip 42 for allowing the passage of air therethrough. The longitudinal-extending portion 41 of the bezel structure 40 may include the bezel top part 46 and the bezel bottom part 48 that may extend substantially in planes parallel to one another. The bezel top part 46 and bezel bottom part 48 can direct the flow of air from a fan assembly 32 (FIG. 6) through the opening 44 toward the outer lens 22 (FIG. 6) and prevent casual observance of various headlamp assembly components.

Figure 4:
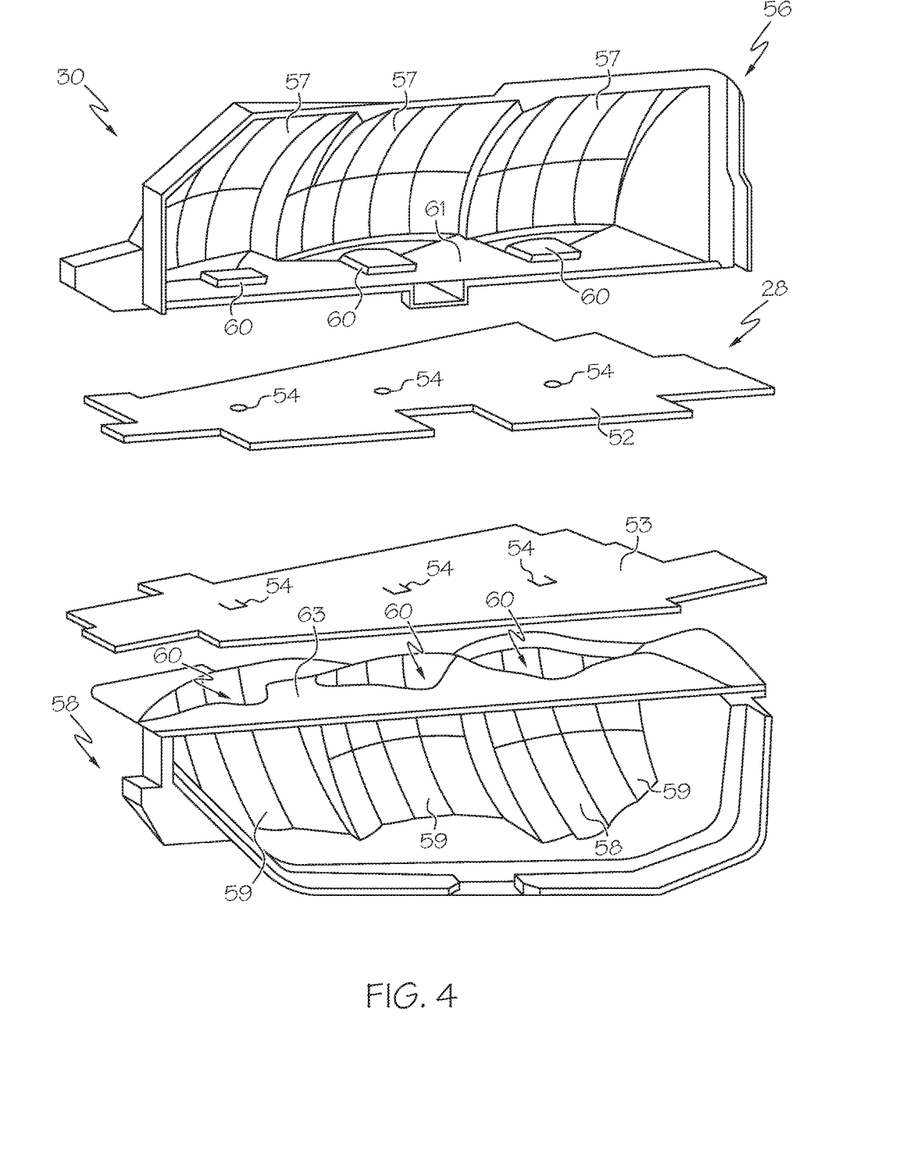
FIG. 4 depicts an exploded view of the lighting assembly of FIG. 2 and a mirror assembly according to one or more embodiments shown and described herein.

A mirror assembly 30 may include a top rear director board 61 and a bottom rear director board 63 (FIG. 4). The top rear director board 61 and bottom rear director board 63 may include one or more rear directors 60. Briefly referring to FIG. 4, particular embodiments of the headlamp assembly 20 may have six light source elements 54 and six rear directors 60: three light source elements 54 and rear directors 60 disposed at the top light source element board 52 and three light source elements 54 and rear directors 60 disposed at the bottom light source element board 53, but embodiments are not so limited. The top and bottom light source element boards 52 and 53 may be substantially planar and electrically connected to the vehicle 10 for powering of the light source elements 54.

Referring back to FIG. 3, the mirror assembly 30 may include the top mirror assembly 56 and the bottom mirror assembly 58. The top mirror assembly 56 may contain one or more top mirrors 57 and the bottom mirror assembly 58 may contain one or more bottom mirrors 59. The top mirrors 57 and bottom mirrors 59 may be disposed to reflect light from the light source element 54 substantially forward in the vehicle-longitudinal direction for illuminating the space forward of a vehicle. FIG. 3 depicts the headlamp assembly 20 having three top mirrors 57 and three bottom mirrors 59, but the headlamp assembly 20 may include more or less top and bottom mirrors 57 and 59. The headlamp assembly 20 may also include a light assembly 28 that includes the top and bottom light source element boards 52 and 53 (FIG. 4) housing the one or more light source elements 54 (FIG. 4).

Referring to FIG. 4, the mirror assembly 30 and the light assembly 28 are shown. Embodiments of the mirror assembly 30 may include the top mirror assembly 56 and the bottom mirror assembly 58 to project light forward in a vehicle-longitudinal direction. Each top mirror assembly 56 may be made of one or more top mirrors 57 and each bottom mirror assembly 58 may be made from one or more bottom mirrors 59. The top mirrors 57 and bottom mirrors 59 may be concave forward in a vehicle-longitudinal direction such that light is directed forward of the vehicle. Additionally, the top mirror assembly 56 and bottom mirror assembly 58 may include one or more rear directors 60 housed on top and bottom rear director boards 61 and 63 for reflecting the light from a light source element 54 in a vehicle rearward direction, toward the top mirrors 57 and bottom mirrors 59 for subsequent vehicle-forward projection. The rear directors 60 may partially enclose the light source elements 54 and inhibit light from projecting from the vehicle at unintended angles. The top and bottom rear director boards 61 and 63 may be substantially flat and lie in a plane substantially parallel to the top and bottom light source element boards 52 and 53.

The light assembly 28 may contain the top and bottom light source element boards 52 and 53 housing one or more light source elements 54. Each light source element 54 may generate light for projection to illuminate the space around or in front of the vehicle 10 and, in particular embodiments, coincide with a particular rear director 60 such that the rear director 60 reflects the light from the light source element 54 back toward the mirrors 57 and 59. The top and bottom light source element boards 52 and 53 may be substantially planar and extend in a plane generally parallel to the direction of travel. When positioned in the headlamp assembly 20 with the bezel assembly 26 (FIG. 5) and the fan assembly 32 (FIG. 6), the top and bottom light source element boards 52 and 53 may help direct the flow of air from the fan 33 toward the outer lens 22 (FIG. 6).

Figure 5:
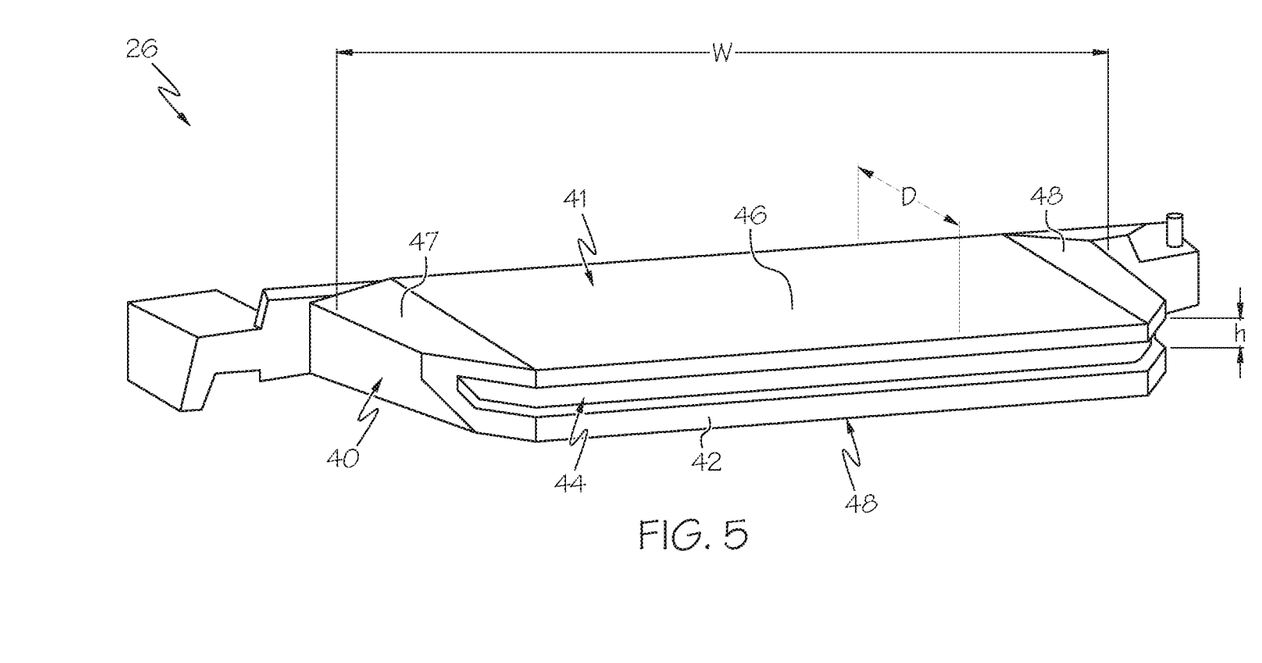
FIG. 5 depicts a perspective view of a bezel assembly for the vehicle headlamp assembly of FIG. 2 according to one or more embodiments shown and described herein.

Referring to FIG. 5, the bezel assembly 26 may include the longitudinal-extending portion 41 of the bezel structure 40. The longitudinal-extending portion 41 of the bezel structure 40 may include the bezel top part 46 and the bezel bottom part 48 and be generally rectangularly planar having a width dimension W in the vehicle-lateral direction and a depth dimension D in the vehicle-longitudinal direction. In particular embodiments, the width dimension W extends farther than the depth dimension D. That is, the longer side of the rectangular bezel top part 46 and bezel bottom part 48 is in the vehicle-lateral direction. The front lip 42 may connect the bezel top part 46 and the bezel bottom part 48 of the longitudinal-extending portion 41 and extend generally orthogonally between them. In some embodiments, the front lip 42 may have the opening 44 extending along the width of the longitudinal-extending portion 41 of the bezel structure 40. The opening 44 may have a particular height h and provide fluid communication for the flow of air between the bezel top part 46 and bezel bottom part 48 toward the outer lens 22 (FIG. 6) of the headlamp assembly 20. The amount of air flowing through the bezel assembly 26 toward the outer lens 22 (FIG. 6) may depend, at least in part, on the height h and width W of the opening 44.

Referring to FIG. 6, bezel top part 46 and the bezel bottom part 48 together with the top and bottom light source element boards 52 and 53 may form an air flow channel 51 for directing air from the fan assembly 32 toward the inner surface 38 of the outer lens 22. The air flow channel 51 may be substantially of constant dimension. In some embodiments, the bezel top part 46 and the bezel bottom part 48, or the top and bottom light source assembly boards 52 and 53 may form a convergent or divergent channel such that air passing through the air flow channel 51 is subjected to an increase or decrease in pressure. Such a channel may aid in the dispersion effect that may be seen at the opening 44 in the front lip 42. In some embodiments, the opening 44 may be part of an air flow directing feature 55 that includes concave sections 43 and 45 that may help to disperse the air flowing through the opening 44 in a wider pattern.

The headlamp assembly 20 may generally have one or more hollow cavities 24 that house various components of the headlamp assembly 20, such as, for example, the bezel assembly 26, the light assembly 28, the mirror assembly 30, the fan assembly 32, and various other components and structure enabling the controlled forward projection of light. In some embodiments, the hollow cavity 24 may be vented to the atmosphere using a vent, such that fresh air can be circulated to the headlamp assembly 20 from outside the headlamp assembly 20.

In particular embodiments, the outer lens 22 may comprise an outer surface 36 and the inner surface 38. The outer surface 36 of the outer lens 22 may be curved convex in the vehicle-forward direction. Such a curve can aid in the wicking of moisture from the outer surface 36 of the outer lens 22 and can reduce air resistance due to air flow over the outer lens 22. The outer lens 22 may substantially enclose the headlamp assembly 20 and protect it from the external elements such as precipitation and wind. In some embodiments, the inner surface 38 of the outer lens 22 is coated in an anti-fog coating 39 such that condensation is minimized on the inner surface 38 of the lens. In some embodiments, the anti-fog coating 39 may cover all or substantially all of the inner surface 38 of the outer lens 22. Suitable anti-fog coatings include hydrophilic polymers, hydrogels and hydrophilic colloids, such as, for example, titanium dioxide. Such a coating may reduce condensation by decreasing the surface tension of moisture on the inner surface 38 of the outer lens 22 or some other suitable method. Limiting condensation along the inner surface 38 of the outer lens 22 of the headlamp assembly 20 can facilitate brighter illumination of external surfaces (e.g., the road) through the outer lens 22. This may be useful in embodiments of headlamp assemblies 20 utilizing LED bulbs for illumination, as LEDs can produce less heat, thereby resulting in bottom surface temperatures of the various surfaces within the headlamp assembly 20.

The headlamp assembly 20 may include a fan assembly 32. The fan assembly 32 may include a fan 33 or some other device for forcing air circulation within the headlamp assembly 20 and the necessary support structure for holding the fan 33 in place. The fan 33 may be a centrifugal fan, a screw fan, a horizontal fan, or any other suitable means for moving air. In some other embodiments, the fan 33 may be an axial-flow fan or a cross-flow fan. In particular embodiments, the fan 33 is generally situated rearward of the above-described components in the vehicle-longitudinal direction in order for the fan 33 to move air across the light source element 54 and towards the outer lens 22 Additionally, the fan assembly 32 may be rearward of the mirror assembly 30 in a vehicle-longitudinal direction and rearward of the air flow channel 51 in a vehicle-longitudinal direction in order to direct air through the air flow channel 51. Embodiments of the fan 33 may include one or more fan blades for pushing air through the headlamp assembly 20.

In particular embodiments, as the fan 33 rotates, a region of high pressure is created forward of the fan 33 such that air (represented by flow lines 64) is forced from the surfaces of the fan blades forward in the vehicle-longitudinal direction. At least a portion of this air 64 may be pushed through the air flow channel 51, that is, between the parallel top and bottom light source element boards 52 and 53 and then through the bezel assembly 26 toward a lower air pressure portion of the headlamp assembly 20 near the outer lens 22. As the air passes between the top and bottom light source element boards 52 and 53, the air absorbs heat generated by the light source elements 54. This heated portion of air is further constrained by the bezel assembly 26 such that it is directed to the outer lens 22 through the opening 44 in the front lip 42 that is positioned in the flow path of the air.

As demonstrated by FIG. 6, in particular embodiments, the opening 44 is formed between concave sections 43 and 45 of the air flow directing feature 55 such that it forms a nozzle for air to flow in the vehicle-longitudinal direction. Concave sections 43 and 45 may be concave forward in a vehicle-longitudinal direction, and may form a sort of diffuser. In embodiments having concave sections 43 and 45, as air passes forward through the opening 44 in the vehicle-longitudinal direction, kinetic energy within the flow of air is converted to pressure energy and the pressure in the flow of air within diffuser increases. Thus, in embodiments having this air flow directing feature 55 the flow of air may disperse in a wider aperture than embodiments without such a feature. The flow of air from the air flow directing feature 55 is depicted by flowlines 64. Such a flow may cause heated air to be distributed across a wider portion of the inner surface 38 of the outer lens 22 such that the outer lens 22 warms and condensation on the inner surface 38 is reduced.

It should be understood that the above-described embodiments provide for systems and methods for reducing condensation within a headlamp assembly by forcing air through the headlamp assembly. This may include forcing air to move forward in a vehicle-longitudinal direction through a bezel assembly comprising a bezel structure having a longitudinal-extending portion and a front lip extending from the longitudinal-extending portion in a vehicle-vertical direction. This may help reduce the amount of condensation on the inner surface of the outer lens of the headlamp assembly. Reducing the amount of condensation on the inner surface of the outer lens of the headlamp assembly may result increased luminosity of the headlamp.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A headlamp assembly for a vehicle, the headlamp assembly comprising:
   an outer lens having an inner surface, the outer lens defining at least part of a cavity;
   a light source element located within the cavity;
   a fan assembly that directs air toward the inner surface of the outer lens;
   a bezel assembly comprising a bezel structure having a longitudinal-extending portion including a bezel top part that directs air from the fan assembly toward a front lip extending from the longitudinal-extending portion in a vehicle-vertical direction, the longitudinal-extending portion directing air flow from the fan assembly toward the front lip, the front lip including an air flow directing feature having an opening through which air flows from the fan assembly toward the inner surface of the outer lens,
   a top light source element board that directs air from the fan assembly toward the front lip; and
   a bottom light source element board that is spaced from the top light source element board in the vehicle-vertical direction thereby forming at least part of an air flow channel therebetween through which air flows from the fan assembly toward the front lip.

2. The headlamp assembly of claim 1, wherein the longitudinal-extending portion of the bezel structure further includes a bezel bottom part that is spaced from the bezel top part in the vehicle-vertical direction forming at least part of the air flow channel therebetween.

3. The headlamp assembly of claim 2, wherein the opening is in fluid communication with the air flow channel.

4. The headlamp assembly of claim 2, wherein the front lip is located between the bezel top part and the bezel bottom part.

5. The headlamp assembly of claim 1, wherein the air flow directing feature includes a concave section that is concave forward in a vehicle-longitudinal direction.

6. The headlamp assembly of claim 1, wherein the air flow directing feature changes an air flow path of the air flowing through the opening of the front lip.

7. A vehicle comprising:
   a headlamp assembly comprising:
      an outer lens having an inner surface, the outer lens defining at least part of a cavity;

a light source element located within the cavity;

a fan assembly that directs air toward the inner surface of the outer lens;

a bezel assembly comprising a bezel structure having a longitudinal-extending portion including a bezel top part that directs air from the fan assembly toward a front lip extending from the longitudinal-extending portion in a vehicle-vertical direction, the longitudinal-extending portion directing air flow from the fan assembly through an opening of the front lip;

a top light source element board that directs air from the fan assembly toward the front lip; and a bottom light source element board that is spaced from the top light source element board in the vehicle-vertical direction thereby forming at least part of an air flow channel therebetween through which the air flows from the fan assembly toward the front lip.

8. The vehicle of claim 7, wherein the front lip includes an air flow directing feature having the opening that changes an air flow path of the air flowing through the opening of the front lip.

9. The vehicle of claim 8, wherein the air flow directing feature includes a concave section that is concave forward in a vehicle-longitudinal direction.

10. The vehicle of claim 7, wherein the longitudinal-extending portion of the bezel structure includes a bezel bottom part that is spaced from the bezel top part in the vehicle-vertical direction forming at least part of the air flow channel therebetween.

11. The vehicle of claim 10, wherein the opening is in fluid communication with the air flow channel.

12. The vehicle of claim 10, wherein the front lip is located between the bezel top part and the bezel bottom part.

13. A method of reducing condensation inside a headlamp comprising:

forcing air to move forward in a vehicle-longitudinal direction from a fan assembly through a bezel assembly comprising a bezel structure having a longitudinal-extending portion including a bezel top part;

forcing air to move forward in the vehicle-longitudinal direction from the fan assembly between a top light source element board and a bottom light source element board that is spaced from the top light source element board in a vehicle-vertical direction thereby forming at least part of an air flow channel therebetween through which the air flows from the fan assembly toward a front lip extending from the longitudinal extending portion in the vehicle-vertical direction; and the longitudinal-extending portion directing air flow from the fan assembly toward the front lip, the front lip including an air flow directing feature having an opening through which air flows from the fan assembly toward an outer lens.

14. The method of claim 13, wherein the longitudinal-extending portion of the bezel structure further includes a bezel bottom part that is spaced from the bezel top part in the vehicle-vertical direction forming at least part of the air flow channel therebetween.

15. The method of claim 14, wherein the opening is in fluid communication with the air flow channel.

16. The method of claim 13, wherein the air flow directing feature includes a concave section that is concave forward in a vehicle-longitudinal direction.

17. The method of claim 13, wherein the air flow directing feature changes an air flow path of the air flowing through the opening of the front lip.

* * * * *